(12) United States Patent
Shiraki

(10) Patent No.: US 8,475,053 B2
(45) Date of Patent: Jul. 2, 2013

(54) INNER RING AND OUTER RING, AND BALL BEARING

(75) Inventor: Toshihiko Shiraki, Yao (JP)

(73) Assignee: JTEKT Corporation, Osaka (JP)

( * ) Notice: Subject to any disclaimer, the term of this patent is extended or adjusted under 35 U.S.C. 154(b) by 252 days.

(21) Appl. No.: 12/844,155

(22) Filed: Jul. 27, 2010

(65) Prior Publication Data
US 2011/0033146 A1 Feb. 10, 2011

(30) Foreign Application Priority Data

Aug. 7, 2009 (JP) ................................. 2009-184586

(51) Int. Cl.
*F16C 33/58* (2006.01)
*F16C 27/00* (2006.01)

(52) U.S. Cl.
USPC ............................ 384/513; 384/515; 384/535

(58) Field of Classification Search
USPC ................. 384/447, 493, 506, 513, 535, 536, 384/557, 559, 560, 569, 581, 582, 605, 611, 384/620, 515
See application file for complete search history.

(56) References Cited

U.S. PATENT DOCUMENTS

| | | | | |
|---|---|---|---|---|
| 2,933,354 A | * | 4/1960 | Primeau | 384/536 |
| 3,053,584 A | * | 9/1962 | Dunn | 384/536 |
| 3,140,901 A | * | 7/1964 | Young | 384/536 |
| 5,295,744 A | * | 3/1994 | Petrzelka et al. | 384/536 |
| 7,404,768 B2 | * | 7/2008 | Yamada | 464/167 |
| 2005/0104354 A1 | * | 5/2005 | Yamada et al. | 280/775 |
| 2008/0095484 A1 | * | 4/2008 | Wirges et al. | 384/536 |

FOREIGN PATENT DOCUMENTS

| | | |
|---|---|---|
| DE | 9007683 U1 | 2/1994 |
| DE | 9400766 U1 | 3/1994 |
| FR | 1.566.650 | 5/1969 |
| JP | A-51-086662 | 7/1976 |
| JP | 04073420 A * | 3/1992 |
| JP | A-09-144763 | 6/1997 |
| JP | A-11-82521 | 3/1999 |
| SU | 1273661 A1 | 11/1986 |

OTHER PUBLICATIONS

"Contiguous." Collins English Dictionary—Complete & Unabridged 10th Edition. HarperCollins Publishers. Nov. 4, 2012. <Dictionary.com http://dictionary.reference.com/browse/contiguous>.*

European Search Report for corresponding European Patent Application No. 10171984.7, mailed on Nov. 15, 2010.

* cited by examiner

*Primary Examiner* — Alan Waits
(74) *Attorney, Agent, or Firm* — Oliff & Berridge, PLC

(57) ABSTRACT

A first fit portion and a second fit portion of an inner ring according to the invention have a spring property. Therefore, the first and second fit portions may be flexed radially outward by elasticity thereof and then fitted to a shaft. Thus, the inner ring is tightly fitted to the shaft with a set interference with respect to the shaft. Accordingly, it is easy to fit/remove the inner ring to/from the shaft. Therefore, an outer peripheral face of the shaft is pushed radially inward by elasticity of the first and second fit portions, that is, the inner ring is tightly fitted to the shaft, without reducing the ease of fitting/removing the inner ring to/from the shaft. As a result, it is possible to minimize generation of creep.

4 Claims, 6 Drawing Sheets

INNER RING AND OUTER RING, AND BALL BEARING

INCORPORATION BY REFERENCE

The disclosure of Japanese Patent Application No. 2009-184586 filed on Aug. 7, 2009 including the specification, drawings and abstract is incorporated herein by reference in its entirety.

BACKGROUND OF THE INVENTION

1. Field of the Invention

The invention relates to a ball bearing, and an inner ring and an outer ring thereof.

2. Description of the Related Art

As an existing ball bearing used for a fuser roller or a heating roller of a copying machine, a ball bearing 101 shown in FIG. 5 is used. The ball bearing 101 is arranged between a shaft end portion 102A of a rotary shaft (roller) 102 and a metal-sheet housing 103, and fitted to the shaft end portion 102A and the metal-sheet housing 103. A snap ring 105 is fitted in an annular groove 104 formed in the shaft end portion 102A. The snap ring 105 restricts the axial position of the ball bearing 101 to prevent the ball bearing 101 from dropping off.

In order to facilitate fitting and removal of the ball bearing 101, the ball bearing 101 and the metal-sheet housing 103 are loosely fitted to each other and the ball bearing 101 and the shaft end portion 102A are also loosely fitted to each other.

Therefore, creep is likely to be generated between an inner ring 106 of the ball bearing 101 and the shaft end portion 102A and between an outer ring 107 of the ball bearing 101 and the metal-sheet housing 103. Accordingly, there is a concern that abnormal noise may be caused due to backlash. In addition, there is a concern that abrasion power may enter the ball bearing 101, resulting in reduced bearing life.

Especially in a ball bearing used for a fuser roller or a heating roller of a copying machine, formation of backlash due to creep and generation of abrasion power become pronounced. This is because a load of several tens of kilograms is applied to the roller in order to fuse ink into paper and feed paper, and, in addition, the load applied to the roller has been increased in recent years due to an increase in the speed of paper feed.

Japanese Patent Application Publication No. 51-86662 (JP-A-51-86662) describes that a bearing 201 is locked to a shaft 203 by a wire 206, a snap ring or a circlip so that relative movement between these members in the axial direction is restricted, as shown in FIG. 6.

With the technology described in JP-A-51-86662, although it is possible to suppress formation of axial backlash between the bearing 201 and the shaft 203 to some extent, it is not possible to prevent generation of creep.

Japanese Patent Application Publication No. 09-144763 (JP-A-09-144763) describes that an inner ring and an outer ring are produced by pressing metal sheets.

According to the technology described in JP-A-09-144763, however, the radial movement of an inner peripheral face of the inner ring is restricted by an end face, an outer side raceway groove and a load backup portion. Therefore, it is not easy to tightly fit the inner ring to a rotary shaft. If the inner ring is forcibly fitted to the rotary shaft, unexpected deformation may occur.

SUMMARY OF INVENTION

It is an object of the invention to provide an inner ring and an outer ring, and a ball bearing with which generation of creep is minimized without reducing the ease of fitting/removing the inner ring and the outer ring, and the ball bearing to/from a shaft or a housing.

An aspect of the invention relates to an inner ring that includes: a first fit portion that extends in such a manner that a diameter of the first fit portion gradually increases toward a first axial end of the inner ring, and that has a spring property; a first end portion that extends radially outward from a first axial end portion of the first fit portion; a first shoulder portion that extends from an outer periphery of the first end portion toward a second axial end of the inner ring, and that faces the first fit portion in a radial direction with a clearance left between the first shoulder portion and the first fit portion; a second fit portion that is formed next to the first fit portion in an axial direction, that extends in such a manner that a diameter of the second fit portion gradually increases toward the second axial end of the inner ring, and that has a spring property; a second end portion that extends radially outward from a second axial end portion of the second fit portion; a second shoulder portion that extends from an outer periphery of the second end portion toward the first axial end of the inner ring, and that faces the second fit portion in the radial direction with a clearance left between the second shoulder portion and the second fit portion; and a raceway portion that has an arc-shaped cross section, that is contiguous to the first shoulder portion and the second shoulder portion, that has an inner ring raceway surface, and that faces the first fit portion and the second fit portion in the radial direction with a clearance left between the raceway portion and the first and second fit portions.

The first fit portion and the second fit portion of the inner ring have a spring property. Therefore, the first and second fit portions may be flexed radially outward by elasticity thereof and then fitted to the shaft. Thus, the inner ring is tightly fitted to the shaft with a set interference with respect to the shaft. Accordingly, it is easy to fit/remove the inner ring to/from the shaft. Therefore, an outer peripheral face of the shaft is pushed radially inward by elasticity of the first and second fit portions, that is, the inner ring is tightly fitted to the shaft, without reducing the ease of fitting/removing the inner ring to/from the shaft. As a result, it is possible to minimize generation of creep.

BRIEF DESCRIPTION OF DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Hereafter, embodiments of the invention will be described in detail with reference to the accompanying drawings.

Figure 1:
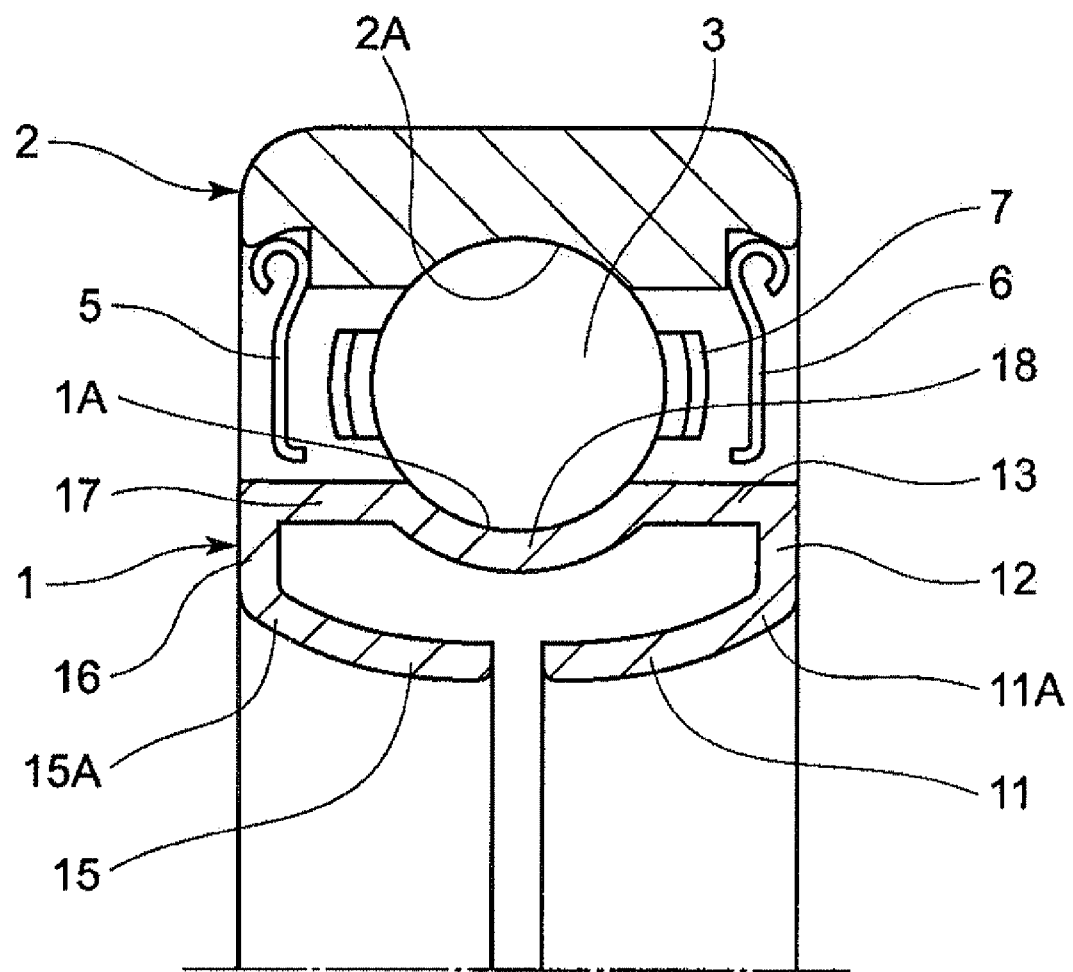
FIG. 1 is a cross-sectional view showing a ball bearing that includes an inner ring according to a first embodiment of the invention.

FIG. 1 shows a ball bearing that includes an inner ring 1 according to a first embodiment of the invention. The ball bearing includes the inner ring 1, an outer ring 2 that serves as an outer member, and a plurality of balls 3 that are arranged between an inner ring raceway surface 1A of the inner ring 1 and an outer ring raceway surface 2A of the outer ring 2 so as to be able to roll therebetween. Shield plates 5 and 6 are fitted to shoulder portions of the outer ring 2, which are at respective axial ends of the outer ring 2. The ball bearing includes a retainer 7 that retains the plurality of balls 3.

The inner ring 1 has an annular first fit portion 11 and an annular first end portion 12. The first fit portion 11 extends in such a manner that the diameter of the first fit portion 11 gradually increases toward a first axial end of the inner ring 1. The first fit portion 11 has a spring property. The first end portion 12 extends radially outward from a first axial end portion 11A of the first fit member 11. The inner ring 1 has a first shoulder portion 13 that extends from an outer periphery of the first end portion 12 toward a second axial end of the inner ring 1, and that faces the first fit portion 11 in the radial direction with a clearance left between the first shoulder portion 13 and the first fit portion 11.

The inner ring 1 has an annular second fit portion 15 and an annular second end portion 16. The second fit portion 15 is formed next to the first fit portion 11 in the axial direction with a clearance left between the second fit portion 15 and the first fit portion 11. The second fit portion 15 extends in such a manner that the diameter of the second fit portion 15 gradually increases toward the second axial end of the inner ring 1. The second fit portion 15 has a spring property. The second end portion 16 extends radially outward from a second axial end portion 15A of the second fit member 15. The inner ring 1 has a second shoulder portion 17 that extends from an outer periphery of the second end portion 16 toward the first axial end of the inner ring 1, and that faces the second fit portion 15 in the radial direction with a clearance left between the second shoulder portion 17 and the second fit portion 15. The inner ring 1 has a raceway portion 18 that has an arc-shaped cross section. The raceway portion 18 is contiguous to the first shoulder portion 13 and the second shoulder portion 17, and has the inner ring raceway surface 1A. The raceway portion 18 faces the first fit portion 11 and the second fit portion 15 in the radial direction with a clearance left between the raceway portion 18 and the first and second fit portions 11 and 15.

In an example in the first embodiment, the inner ring 1 is produced by pressing a metal sheet, and a spring property is imparted to the inner ring 1 by carburizing and quenching.

Figure 2:
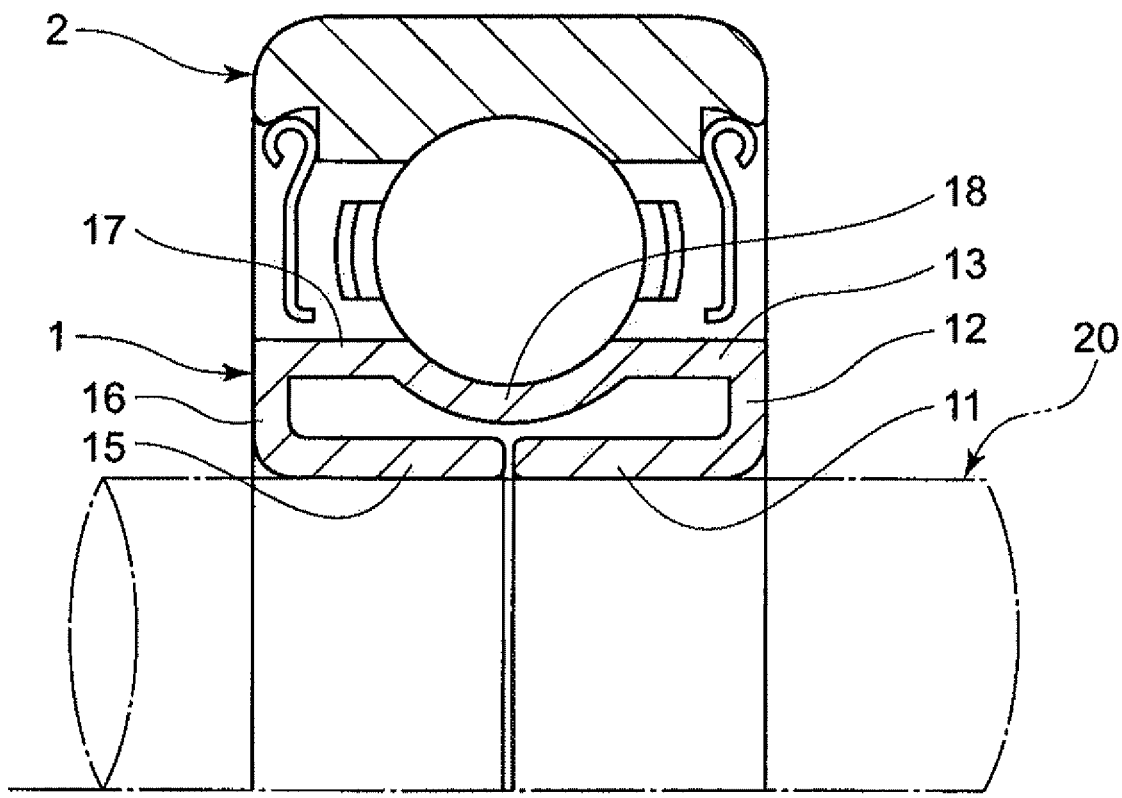
FIG. 2 is a cross-sectional view showing the state where the inner ring of the ball bearing in FIG. 1 is tightly fitted to a shaft.

The first fit portion 11 and the second fit portion 15 of the inner ring 1 according to the first embodiment have a spring property. Therefore, as shown in FIG. 2, the first fit portion 11 and the second fit portion 15 may be flexed radially outward by elasticity thereof and then fitted to a shaft 20. Thus, the inner ring 1 is tightly fitted to the shaft 20 with a set interference with respect to the shaft 20. Accordingly, it is easy to fit the inner ring 1 to the shaft 20 and to remove the inner ring 1 from the shaft 20. Therefore, an outer peripheral face of the shaft 20 is pushed radially inward by elasticity of the first and second fit portions 11 and 15, that is, the inner ring 1 is tightly fitted to the shaft 20, without reducing the ease of fitting the inner ring 1 to the shaft 20 and removing the inner ring 1 from the shaft 20. As a result, it is possible to minimize generation of creep.

With the inner ring 1 according to the first embodiment, eccentricity of the shaft 20 is tolerated because the first fit portion 11 and the second fit portion 15 have a spring property. In addition, in the inner ring 1 according to the first embodiment, as shown in FIG. 2, when the inner ring 1 is fitted to the shaft 20, the first fit portion 11 and the second fit portion 15 are flexed so as to extend at substantially right angle to the first end portion 12 and the second end portion 16, respectively, and the first end portion 12 and the second end portion 16, which extend from the axial ends of the first shoulder portion 13 and the second shoulder portion 17, respectively, at substantially right angle, bear a load from the shaft 20. Therefore, when the inner ring 1 is fitted to the shaft 20, elastic deformation of the first and second fit portions 11 and 15 does not exert a large influence.

With the ball bearing that includes the inner ring 1, it is possible to minimize generation of creep by pushing the outer peripheral face of the shaft 20 radially inward using a spring property of the first and second fit portions 11 and 15 of the inner ring 1.

In addition, the ball bearing that includes the inner ring 1 is preferably used to minimize generation of creep when high degree of ease of fitting the ball bearing is demanded although a demand for the accuracy of a shaft center is relatively low. For example, the ball bearing 1 is preferably used to support a fuser roller or a heating roller of a copying machine.

Figure 3:
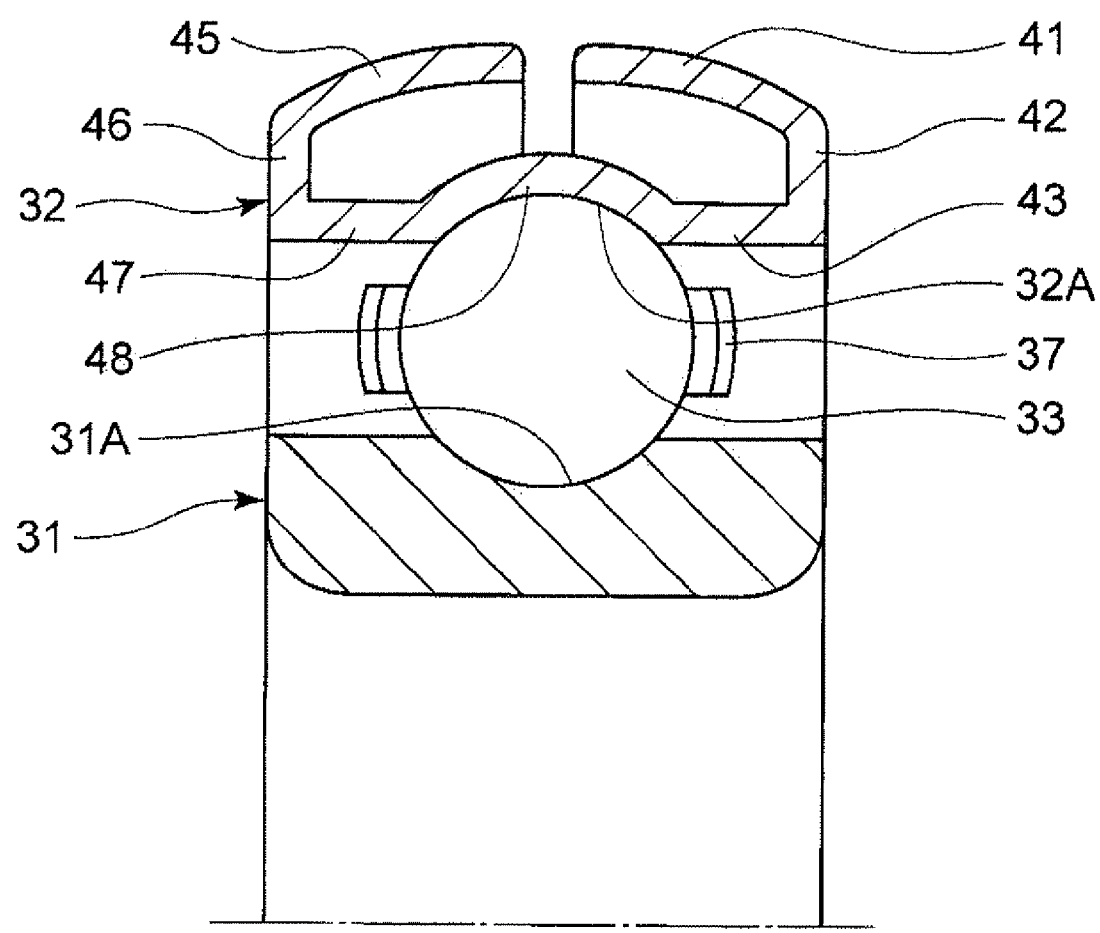
FIG. 3 is a cross-sectional view showing a ball bearing that includes an outer ring according to a second embodiment of the invention.

Next, a ball bearing that includes an outer ring 32 according to a second embodiment of the invention will be described with reference to FIG. 3. The ball bearing includes an inner ring 31 that serves as an inner member, the outer ring 32, and a plurality of balls 33 that are arranged between an inner ring raceway surface 31A of the inner ring 31 and an outer ring raceway surface 32A of the outer ring 32 so as to be able to roll therebetween. The ball bearing includes a retainer 37 that retains the plurality of balls 33.

The outer ring 32 has an annular first fit portion 41 and an annular first end portion 42. The first fit portion 41 extends in such a manner that the diameter of the first fit portion 41 gradually decreases toward a first axial end of the outer ring 32. The first fit portion 41 has a spring property. The first end portion 42 extends radially inward from a first axial end portion of the first fit member 41. The outer ring 32 has a first shoulder portion 43 that extends from an inner periphery of the first end portion 42 toward a second axial end of the outer ring 32, and that faces the first fit portion 41 in the radial direction with a clearance left between the first shoulder portion 43 and the first fit portion 41.

The outer ring 32 has an annular second fit portion 45 and an annular second end portion 46. The second fit portion 45 is formed next to the first fit portion 41 in the axial direction with a clearance left between the second fit portion 45 and the first fit portion 41. The second fit portion 45 extends in such a manner that the diameter of the second fit portion 45 gradually decreases toward the second axial end of the outer ring 32. The second fit portion 45 has a spring property. The second end portion 46 extends radially inward from a second axial end portion of the second fit member 45.

The outer ring 32 has a second shoulder portion 47 that extends from an inner periphery of the second end portion 46 toward the first axial end of the outer ring 32, and that faces the second fit portion 45 in the radial direction with a clearance left between the second shoulder portion 47 and the second fit portion 45. The outer ring 32 has a raceway portion 48 that has an arc-shaped cross section. The raceway portion 48 is contiguous to the first shoulder portion 43 and the second shoulder portion 47, and has the outer ring raceway surface 32A. The raceway portion 48 faces the first fit portion 41 and the second fit portion 45 in the radial direction with a clearance left between the raceway portion 48 and the first and second fit portions 41 and 45.

In an example in the second embodiment, the outer ring 32 is produced by pressing a metal sheet, and a spring property is imparted to the outer ring 32 by carburizing and quenching.

Figure 4:
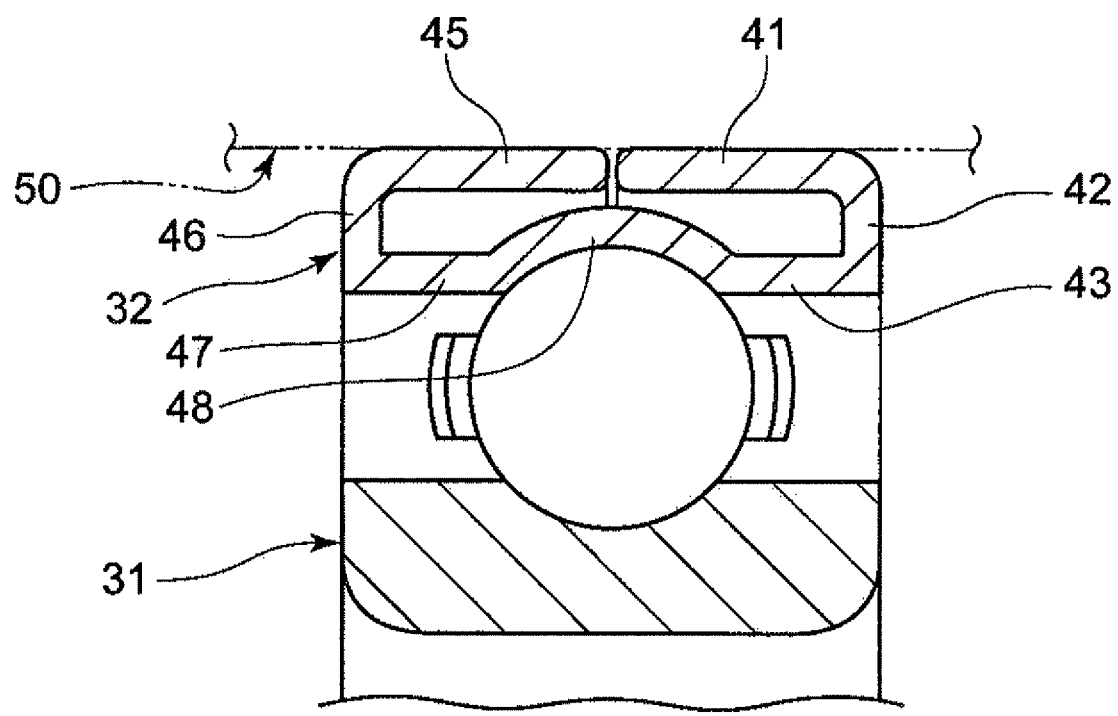
FIG. 4 is a cross-sectional view showing the state where the outer ring of the ball bearing in FIG. 3 is tightly fitted to a housing.
Figure 5:
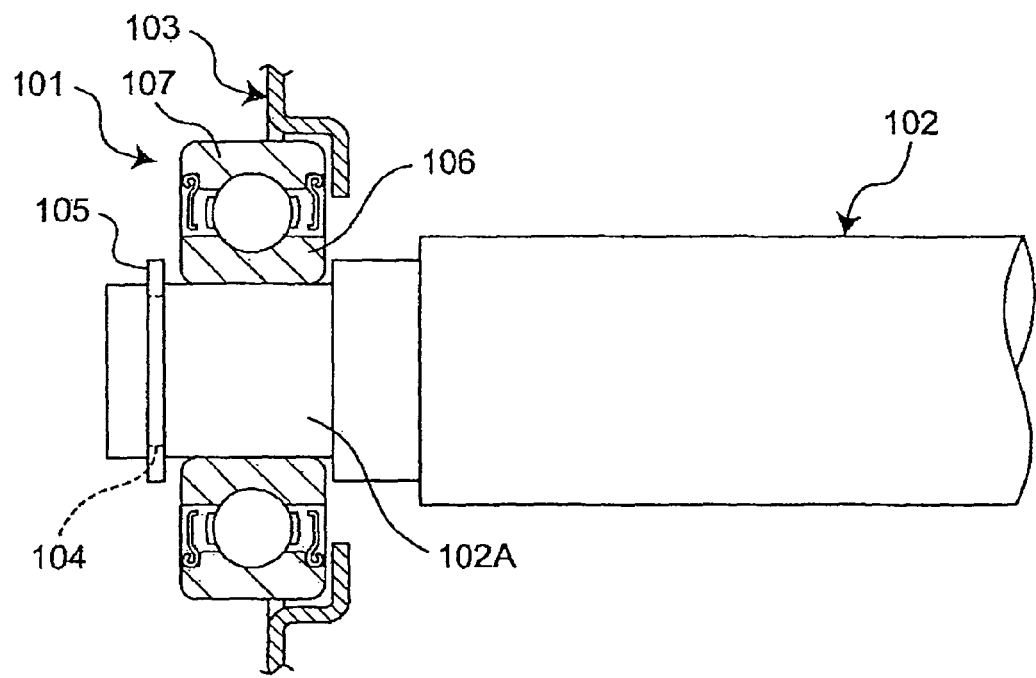
FIG. 5 is a cross-sectional view showing an existing ball bearing.
Figure 6:
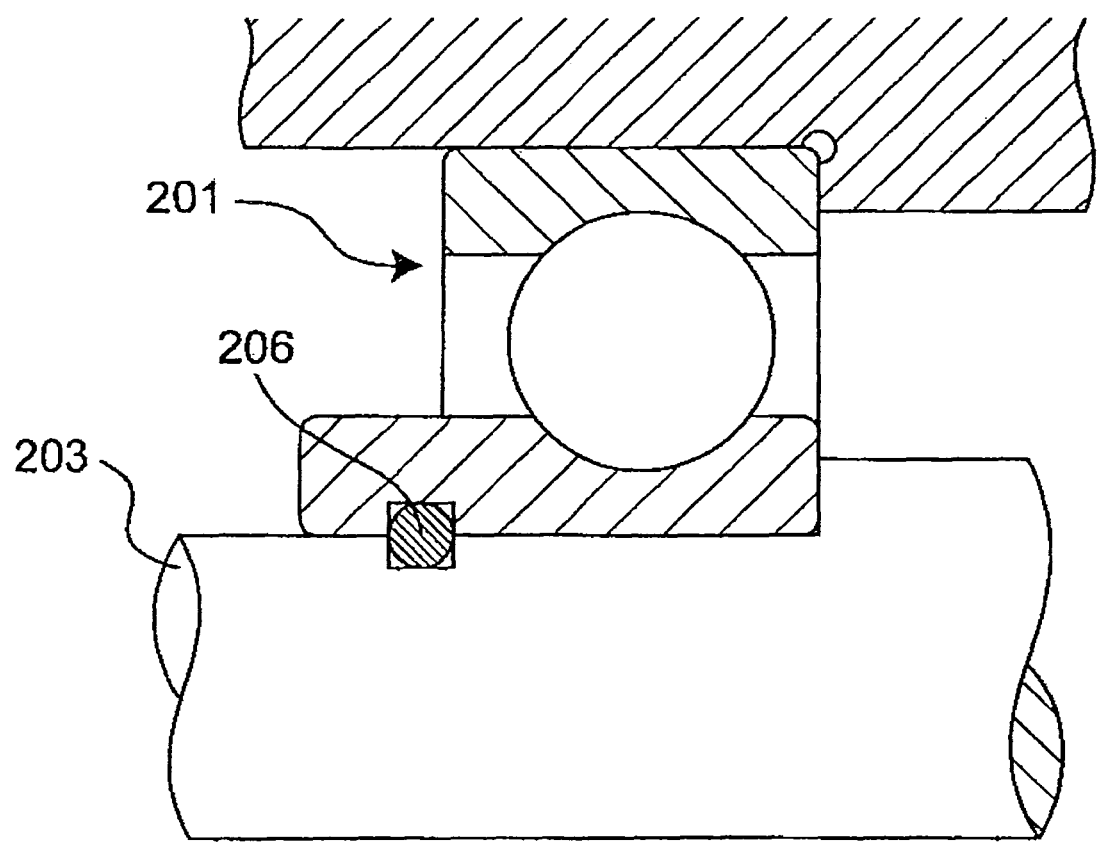
FIG. 6 is a cross-sectional view showing another existing ball bearing.

The first fit portion 41 and the second fit portion 45 of the outer ring 32 according to the second embodiment have a spring property. Therefore, as shown in FIG. 4, the first fit portion 41 and the second fit portion 45 may be flexed radially inward by elasticity thereof and then fitted into a housing 50. Thus, the outer ring 32 is tightly fitted to the housing 50 with a set interference with respect to the housing 50. Accordingly, it is easy to fit the outer ring 32 to the housing 50 and to remove the outer ring 32 from the housing 50. Thus, the outer ring 32 is tightly fitted to the housing 50 without reducing the ease of fitting the outer ring 32 to the housing 50 and removing the outer ring 32 from the housing 50. Therefore, the inner peripheral face of the housing 50 is pushed radially outward by elasticity of the first and second fit portions 41 and 45. As a result, it is possible to minimize generation of creep.

With the outer ring 32 according to the second embodiment, eccentricity of the housing 50 is tolerated because the first fit portion 41 and the second fit portion 45 have a spring property. In addition, in the outer ring 32 according to the second embodiment, as shown in FIG. 4, when the outer ring 32 is fitted to the housing 50, the first fit portion 41 and the second fit portion 45 are flexed so as to extend at substantially right angle to the first end portion 42 and the second end portion 46, respectively, and the first end portion 42 and the second end portion 46, which extend from the axial ends of the first shoulder portion 43 and the second shoulder portion 47, respectively, at substantially right angle, bear a load from the housing 50. Therefore, when the outer ring 32 is fitted to the housing 50, elastic deformation of the first and second fit portions 41 and 45 does not exert a large influence.

With the ball bearing that includes the outer ring 32, it is possible to minimize generation of creep by pushing the inner peripheral face of the housing 50 radially outward using a spring property of the first and second fit portions 41 and 45 of the outer ring 32.

In addition, the ball bearing that includes the outer ring 32 is preferably used to minimize generation of creep when high degree of ease of fitting the ball bearing is demanded although a demand for the accuracy of shaft center is relatively low. For example, the ball bearing is preferably used to support a fuser roller or a heating roller of a copying machine.

A ball bearing that includes the inner ring 1 according to the first embodiment and the outer ring 32 according to the second embodiment may be implemented.

The invention claimed is:

1. An inner ring, comprising:
a first fit portion that extends in such a manner that a diameter of the first fit portion increases toward a first axial end of the inner ring, and that has a spring property;
a first end portion that extends radially outward from a first axial end portion of the first fit portion;
a first shoulder portion that extends from an outer periphery of the first end portion toward a second axial end of the inner ring, and that faces the first fit portion in a radial direction with a clearance left between the first shoulder portion and the first fit portion;
a second fit portion that is formed next to the first fit portion in an axial direction, that extends in such a manner that a diameter of the second fit portion increases toward the second axial end of the inner ring, and that has a spring property;
a second end portion that extends radially outward from a second axial end portion of the second fit portion;
a second shoulder portion that extends from an outer periphery of the second end portion toward the first axial end of the inner ring, and that faces the second fit portion in the radial direction with a clearance left between the second shoulder portion and the second fit portion; and
a raceway portion that has an arc-shaped cross section, that is contiguous to the first shoulder portion and the second shoulder portion, that has an inner ring raceway surface, and that faces the first fit portion and the second fit portion in the radial direction with a clearance left between the raceway portion and the first and second fit portions, wherein
the first fit portion, the first end portion, the first shoulder portion, the second fit portion, the second end portion, the second shoulder portion and the raceway portion are monolithically formed, and
the first fit portion and the second fit portion are curved in the axial direction; and
wherein the first shoulder portion is substantially perpendicular to the first end portion, or the second shoulder portion is substantially perpendicular to the second end portion.

2. A ball bearing, comprising:
the inner ring according to claim 1;
an outer member that has an outer ring raceway surface; and
a ball that is arranged between the inner ring raceway surface and the outer ring raceway surface so as to be able to roll between the inner ring raceway surface and the outer ring raceway surface.

3. An outer ring, comprising:
a first fit portion that extends in such a manner that a diameter of the first fit portion decreases toward a first axial end of the outer ring, and that has a spring property;
a first end portion that extends radially inward from a first axial end portion of the first fit portion;
a first shoulder portion that extends from an inner periphery of the first end portion toward a second axial end of the outer ring, and that faces the first fit portion in a radial direction with a clearance left between the first shoulder portion and the first fit portion;
a second fit portion that is formed next to the first fit portion in an axial direction, that extends in such a manner that a diameter of the second fit portion decreases toward the second axial end of the outer ring, and that has a spring property;
a second end portion that extends radially inward from a second axial end portion of the second fit portion;
a second shoulder portion that extends from an inner periphery of the second end portion toward the first axial end of the outer ring, and that faces the second fit portion in the radial direction with a clearance left between the second shoulder portion and the second fit portion; and
a raceway portion that has an arc-shaped cross section, that is contiguous to the first shoulder portion and the second shoulder portion, that has an outer ring raceway surface, and that faces the first fit portion and the second fit portion in the radial direction with a clearance left between the raceway portion and the first and second fit portions, wherein
the first fit portion, the first end portion, the first shoulder portion, the second fit portion, the second end portion, the second shoulder portion and the raceway portion are monolithically formed, and the first fit portion and the second fit portion are curved in the axial direction; and wherein the first shoulder portion is substantially perpendicular to the first end portion, or the second shoulder portion is substantially perpendicular to the second end portion.

4. A ball bearing, comprising:

the outer ring according to claim 3;

an inner member that has an inner ring raceway surface; and a ball that is arranged between the inner ring raceway surface and the outer ring raceway surface so as to be able to roll between the inner ring raceway surface and the outer ring raceway surface.

* * * * *